United States Patent
Park et al.

(10) Patent No.: US 10,454,091 B2
(45) Date of Patent: Oct. 22, 2019

(54) RECHARGEABLE BATTERY COMPRISING FIRST AND SECOND ELECTRODES EACH COMPRISING UNCOATED REGIONS AND COATED REGIONS

(71) Applicant: SAMSUNG SDI CO., LTD., Yongin-si, Gyeonggi-do (KR)

(72) Inventors: Seung-Hee Park, Yongin-si (KR); Jea-Woan Lee, Yongin-si (KR); Chan Hong, Yongin-si (KR); Se-Ho Park, Yongin-si (KR); Soo-Mi Eo, Yongin-si (KR); Young-Kwang Cho, Yongin-si (KR); Yi-Seop Ahn, Yongin-si (KR); Yu-Mi Ha, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 530 days.

(21) Appl. No.: 14/927,369

(22) Filed: Oct. 29, 2015

(65) Prior Publication Data
US 2016/0126528 A1   May 5, 2016

(30) Foreign Application Priority Data

Nov. 4, 2014   (KR) .................. 10-2014-0152320

(51) Int. Cl.
*H01M 6/10*  (2006.01)
*H01M 2/30*  (2006.01)
(Continued)

(52) U.S. Cl.
CPC ........... *H01M 2/30* (2013.01); *H01M 2/0212* (2013.01); *H01M 2/06* (2013.01); *H01M 10/0431* (2013.01); *H01M 10/0587* (2013.01)

(58) Field of Classification Search
CPC ........ H01M 2/30; H01M 2/0212; H01M 2/06; H01M 10/0431; H01M 10/0587
See application file for complete search history.

(56) References Cited

U.S. PATENT DOCUMENTS

2005/0058908 A1* 3/2005 Imachi .................. H01M 2/266
429/233
2013/0244073 A1   9/2013 Fujimoto et al.

FOREIGN PATENT DOCUMENTS

CN    202905908 U    4/2013
CN    203218374 U    9/2013
(Continued)

OTHER PUBLICATIONS

Patent Abstracts of Japan with English Machine Translation of Japanese Pub. No. JP 2006-134763, dated May 25, 2006, for JP 4222292 B2, 17 pages.
(Continued)

*Primary Examiner* — Raymond Alejandro
(74) *Attorney, Agent, or Firm* — Lewis Roca Rothgerber Christie LLP

(57) ABSTRACT

A rechargeable battery includes a wound electrode assembly including a separator between a first electrode and a second electrode, the first and second electrodes each including uncoated regions and coated regions; a case accommodating the electrode assembly; and a first electrode terminal and a second electrode terminal respectively coupled to the first and second electrodes and extending from the case, an uncoated region of the first electrode including inner and outer uncoated regions of a terminal end portion located at an outermost side of the electrode assembly, and the second electrode including an outer uncoated region of a terminal end portion facing the inner uncoated region of the first electrode and an additional inner coated region at an opposite side of the outer uncoated region.

9 Claims, 4 Drawing Sheets

(51) Int. Cl.
*H01M 2/06* (2006.01)
*H01M 2/02* (2006.01)
*H01M 10/04* (2006.01)
*H01M 10/0587* (2010.01)

(56) References Cited

FOREIGN PATENT DOCUMENTS

| | | |
|---|---|---|
| CN | 103415955 A | 11/2013 |
| JP | 2007-335165 A | 12/2007 |
| JP | 4222292 B2 | 2/2009 |
| KR | 10-2012-0095039 A | 8/2012 |

OTHER PUBLICATIONS

Chinese Patent First Office Action with Full English Translation dated Aug. 23, 2019 and accompanying Search Report dated Aug. 16, 2019, for corresponding Chinese Patent Application No. 201510725870.X, 16 pages.

* cited by examiner

RECHARGEABLE BATTERY COMPRISING FIRST AND SECOND ELECTRODES EACH COMPRISING UNCOATED REGIONS AND COATED REGIONS

CROSS-REFERENCE TO RELATED APPLICATION

This application claims priority to and the benefit of Korean Patent Application No. 10-2014-0152320 filed in the Korean Intellectual Property Office on Nov. 4, 2014, the entire contents of which are incorporated herein by reference.

BACKGROUND

1. Field

The present invention relates to a rechargeable battery.

2. Description of the Related Art

With advancement of technology for mobile devices, demand for rechargeable batteries as energy sources has been increasing.

A rechargeable battery differs from a primary battery in that it can be repeatedly charged and discharged, while the latter is incapable of being recharged.

A low-capacity rechargeable battery is used in small portable electronic devices such as mobile phones, notebook computers, and camcorders, while a high-capacity rechargeable battery can be used as a power source for driving motors of a hybrid vehicle, an electric vehicle, and the like.

For example, a rechargeable battery may include an electrode assembly for performing charging and discharging operations, a case (or pouch) for accommodating the electrode assembly, and electrode tabs through which the electrode assembly is drawn out of the cap plate.

As the trend of increasingly high-capacity rechargeable batteries continues, energy density increases and safety deteriorates as well.

In order to improve this, sometimes uncoated regions are provided to be elongated at terminal end portions of the positive and negative electrodes, thereby causing an initial short-circuit between a positive electrode member and a negative electrode member when a conductive member penetrates.

Accordingly, when heat is generated due to a high current, the elongated uncoated regions serve to prevent other members, for example, a separator, from catching fire.

The additional uncoated regions of the positive and negative electrode members and a resultant additional portion of the separator decrease internal volume of the rechargeable battery while not affecting battery capacity.

The above information disclosed in this Background section is only for enhancement of understanding of the background of the invention and therefore it may contain information that does not form the prior art that is already known in this country to a person of ordinary skill in the art.

SUMMARY

One aspect of the present invention provides a rechargeable battery for enabling increased battery capacity and improved safety.

A rechargeable battery according to an exemplary embodiment of the present invention includes: an electrode assembly spirally wound by interposing a separator between a first electrode and a second electrode that include uncoated regions and coated regions; a case for accommodating the electrode assembly; and a first electrode terminal and a second electrode terminal coupled to the first and second electrodes to be drawn out of the case. An uncoated region of the first electrode includes inner and outer uncoated regions of a terminal end portion that is disposed at an outermost side of the electrode assembly, and the second electrode includes an outer uncoated region of a terminal end portion facing the inner uncoated region of the first electrode and an additional inner coated region at an opposite side of the outer uncoated region.

In the terminal end portion, the inner uncoated region of the first electrode may have a first length L1 corresponding to a width W of the electrode assembly, and the outer uncoated region of the first electrode may have a second length L2 corresponding to one winding range of the outermost side of the electrode assembly.

The outer uncoated region of the second electrode may have a third length L3 that is greater than a width W of the electrode assembly or set to two-thirds thereof.

The additional inner coated region may be formed at the opposite side of the outer uncoated region of the second electrode to have the same length as the third length.

The additional inner coated region may include one portion that is formed to have a thickness which is greater than a thickness of the inner coated region that is formed at an inner side of the second electrode.

The first electrode may further include double-sided uncoated regions of a front end portion that is disposed at a center of the electrode assembly, the second electrode may include inner and outer uncoated regions of the front end portion in the front end portion that is disposed at the center of the electrode assembly, the second electrode terminal may be coupled to the inner uncoated region of the front end portion, and an additional outer coated region may be provided at an opposite side of the inner uncoated region of the front end portion.

The additional outer coated region may be formed to have the same thickness as that of the outer coated region that is formed at an outer side of the second electrode.

The second electrode may include an additional inner coated region that is formed at an opposite side of the outer uncoated region in the terminal end portion of the electrode assembly, and an additional outer coated region that is formed at an opposite side of the inner uncoated region of the front end portion in the front end portion of the electrode assembly.

The uncoated region of the first electrode may further include double-sided uncoated regions corresponding to the outer uncoated region of the second electrode in the front end portion of the electrode assembly, and the coated region of the first electrode includes double-sided coated regions corresponding to the additional outer coated region.

As described above, in the exemplary embodiment of the present invention, the battery capacity can be increased since the additional inner coated region is provided at the opposite side of the outer uncoated region of the second electrode to face the coated region of the first electrode, and an initial short-circuit is caused to improve safety when the conductive member penetrates since the outer uncoated region of the second electrode faces the inner uncoated region of the first electrode.

DETAILED DESCRIPTION

Figure 1:
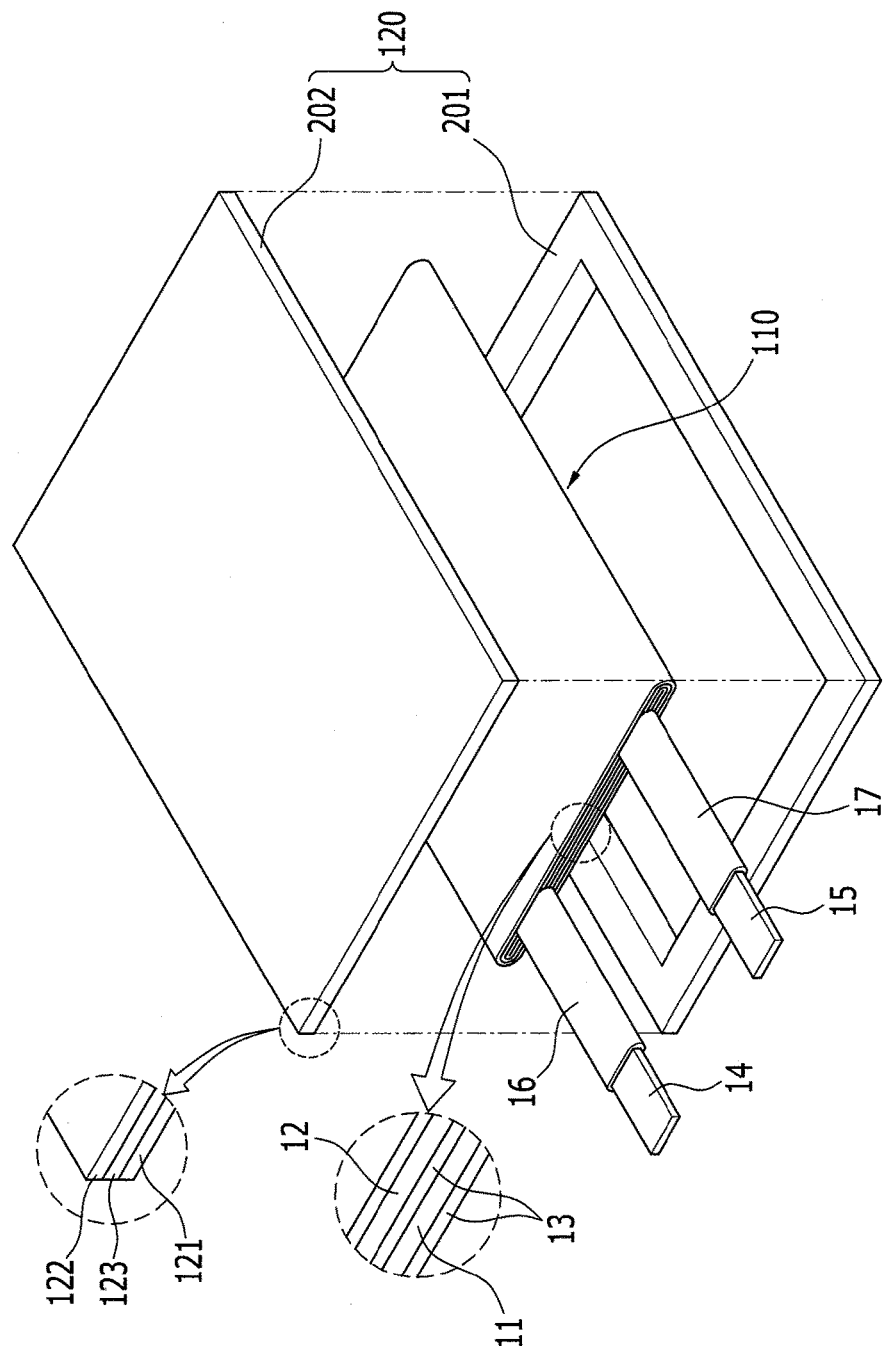
FIG. 1 is an exploded perspective view of a rechargeable battery according to an exemplary embodiment of the present invention.

The present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

Figure 2:
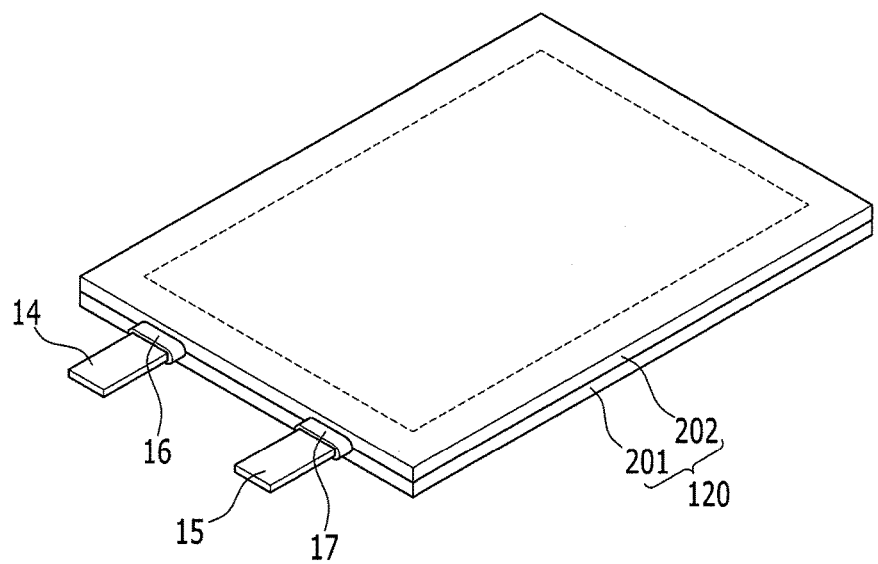
FIG. 2 is a perspective view of the rechargeable battery of FIG. 1.

FIG. 1 is an exploded perspective view of a rechargeable battery according to an exemplary embodiment of the present invention, and FIG. 2 is a perspective view of the rechargeable battery of FIG. 1.

Referring to FIGS. 1 and 2, the rechargeable battery includes an electrode assembly 110, and a case (hereinafter referred to as "pouch 120") for accommodating the electrode assembly 110.

The electrode assembly 110 is formed in a jelly-roll form by providing a first electrode 11 (for convenience, referred to as a "positive electrode") and a second electrode 12 (for convenience, referred to as a "negative electrode") with a separator 13 therebetween.

The separator 13 may be formed of a polymer film through which lithium ions can pass.

The electrode assembly 110 further includes a first electrode terminal 14 (for convenience, referred to as a "positive electrode terminal") and a second electrode terminal 15 (for convenience, referred to as a "negative electrode terminal") that are respectively coupled to the positive and negative electrodes 11 and 12.

Figure 3:
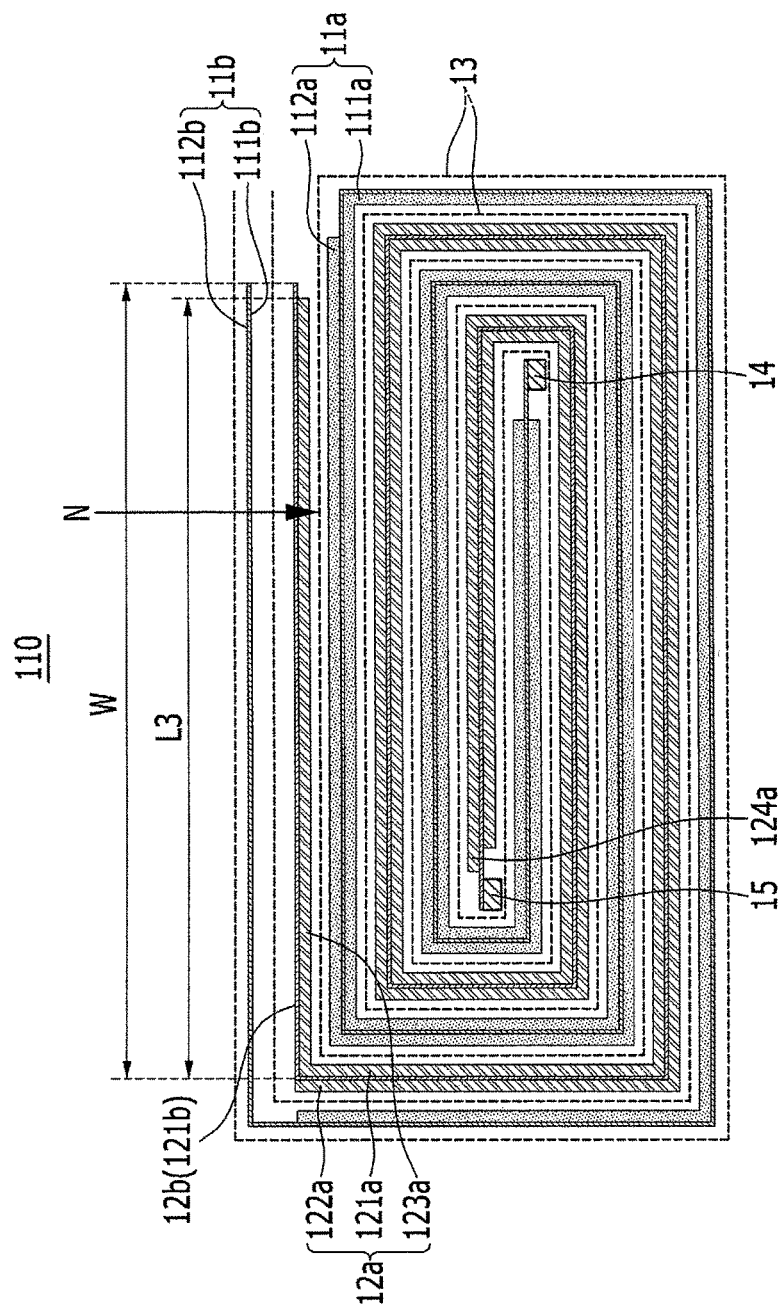
FIG. 3 is an enlarged cross-sectional view of an electrode assembly applicable to FIG. 1.
Figure 4:
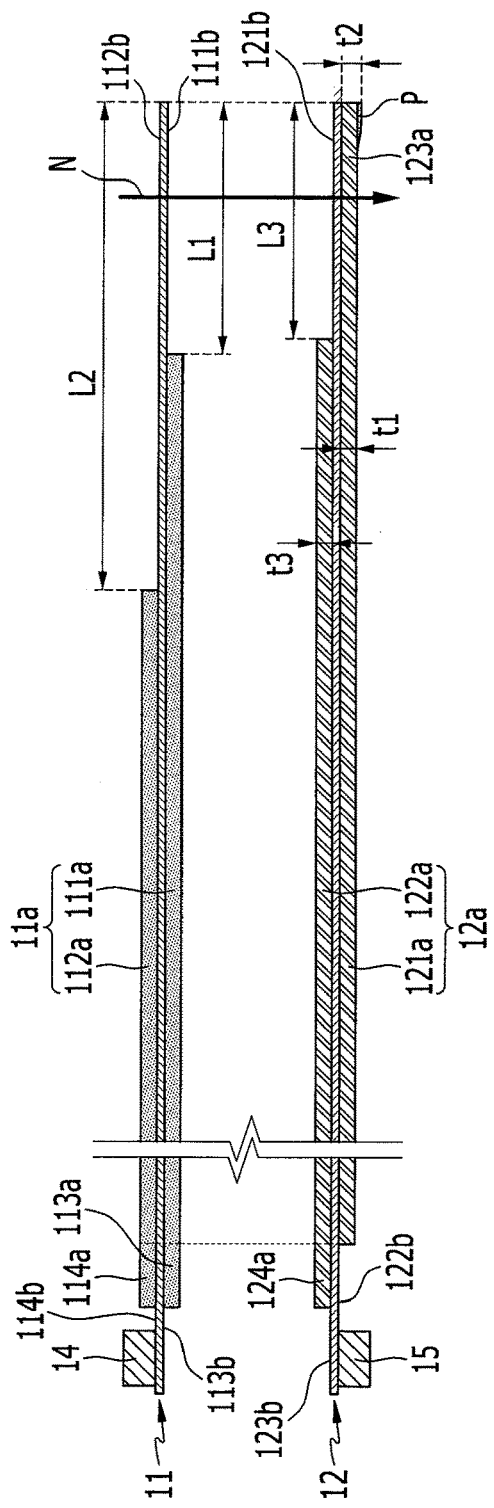
FIG. 4 is a cross-sectional view of a front end portion and a terminal end portion of a positive electrode and a negative electrode applicable to the electrode assembly of FIG. 3 when they are unfolded.

FIG. 3 is an enlarged cross-sectional view of the electrode assembly applicable to FIG. 1, and FIG. 4 is a cross-sectional view of a front end portion and a terminal end portion of the positive electrode and the negative electrode applicable to the electrode assembly of FIG. 3 when they are unfolded.

Referring to FIGS. 3 and 4, the positive electrode 11 includes a coated region 11a where an active material is coated on a current collector made of a thin metal plate (an inner coated region 111a and an outer coated region 112a), and an uncoated region 11b that is formed as an exposed current collector because an active material is not coated thereon.

For example, the current collector of the positive electrode 11 and the positive electrode terminal 14 may be formed of aluminum (Al).

The negative electrode 12 includes a coated region 12a where an active material different from the active material of the positive electrode 11 is coated on a current collector made of a thin metal plate (an inner coated region 121a and an outer coated region 122a), and an uncoated region 12b that is formed as an exposed current collector because an active material is not coated thereon.

For example, the current collector of the negative electrode 12 and the negative terminal 15 may be formed of copper (Cu).

The positive electrode terminal 14 is coupled to the uncoated region 11b of the positive electrode 11, and the negative electrode terminal 15 is coupled to the uncoated region 12b of the negative electrode 12 while being spaced from the positive electrode terminal 14.

The positive and negative electrode terminals 14 and 15 separately extend from the same lateral side of the electrode assembly 10 (to the left of FIGS. 1 and 2).

Though not illustrated, the positive and negative terminals may be located at different lateral sides of the electrode assembly (for example, to the left and right of FIGS. 1 and 2).

Referring back to FIGS. 1 and 2, the pouch 120 accommodates the electrode assembly 110, and an outer portion of the electrode assembly 110 is thermo-bonded to form the rechargeable battery.

In one embodiment, the positive and negative electrode terminals 14 and 15 are coated with insulating members 16 and 17 to extend from the pouch 120 through the thermo-bonded portion.

In other words, the insulating members 16 and 17 electrically insulate the positive electrode terminal 14 from the negative electrode terminal 15, and electrically insulate the positive and negative electrode terminals 14 and 15 from the pouch 120.

The pouch 120 may be formed to have a multi-layered sheet structure that encloses an exterior of the electrode assembly 110.

In one embodiment, the pouch 120 includes a polymer sheet 121 that forms an inner side and performs insulating and thermo-bonding functions, a PET (polyethylene terephthalate) sheet that forms an outer side and performs a protecting function, a nylon sheet or a PET-nylon composite sheet 122 (for convenience, a "nylon sheet" will be exemplarily described), and a metal sheet 123 that provides mechanical strength.

The metal sheet 123 is interposed between the polymer sheet 121 and the nylon sheet 122, and may be formed of, for example, an aluminum sheet.

The pouch 120 includes a first exterior member 201 that accommodates the electrode assembly 110, and a second exterior member 202 that is thermo-bonded to the first exterior member 201 outside of the electrode assembly 110 while covering the electrode assembly 110.

The first and second exterior members 201 and 202 may be formed to have the same structure in which the polymer sheet 121, the nylon sheet 122, and the metal sheet 123 are layered.

For example, the first exterior member 201 is formed to have a concave shape for accommodating the electrode assembly 110, and the second exterior member 202 is formed to have a flat shape for covering the electrode assembly 110 accommodated in the first exterior member 201.

In one embodiment, the second exterior member may be coupled to the first exterior member.

Referring back to FIGS. 3 and 4, the uncoated region 11b of the positive electrode 11 includes inner and outer uncoated regions 111b and 112b in a terminal end portion that is located at an outermost side of the electrode assembly 110.

In the terminal end portion of the electrode assembly 110, the inner uncoated region 111b of the positive electrode 11 has a first length L1 corresponding to a width W (L1=W) of the electrode assembly 110.

The outer uncoated region 112b of the positive electrode 11 has a second length L2 corresponding to one winding range of the outermost side of the electrode assembly 110.

The outer uncoated region 112b prevents unnecessary waste of a material for the coated region 11b of the positive electrode 11 since it does not face the coated region 12a of the negative electrode 12.

The negative electrode 12 includes an outer uncoated region 121b of the terminal end portion that faces the inner uncoated region 111b of the positive electrode 11, and an additional inner coated region 123a at an opposite side of the outer uncoated region 121b.

The outer uncoated region 121b of the negative electrode 12 may have a third length L3 that is greater than the width W of the electrode assembly 110 or set to about two-thirds thereof.

The outer uncoated region 121b of the negative electrode 12 faces the inner uncoated region 111b of the positive electrode 11 to cause a short-circuit at the outermost side of the electrode assembly 110 when a conductive member N penetrates, thereby improving safety of the rechargeable battery.

The additional inner coated region 123a of the negative electrode 12 is formed at the opposite side of the outer uncoated region 121b of the negative electrode 12 to have the same length as the third length L3.

The additional inner coated region 123a faces the outer coated region 112a of the positive electrode 12 in the electrode assembly 110, thereby increasing capacity of the rechargeable battery.

The additional inner coated region 123a includes one portion P that is formed to have a thickness t2 which is greater than a thickness t1 of the inner coated region 121a that is formed at an inner side of the negative electrode 12.

The additional inner coated region 123a may receive more lithium ions moving from the positive electrode 11 to the negative electrode 12 in the terminal end portion of the electrode assembly 110.

Accordingly, lithium is not deposited in the current collector of the negative electrode 12 that corresponds to the additional inner coated region 123a.

In other words, compared with an electrode assembly that is not provided with the additional inner coated region, the electrode assembly 110 of the present invention may have higher stability.

In one embodiment, in the front end portion disposed at a center of the electrode assembly 110, the positive electrode 11 further includes double-sided uncoated regions 113b and 114b.

In the front end portion located at the center of the electrode assembly 110, the negative electrode 12 includes an inner uncoated region 122b of the front end portion and an outer uncoated region 123b of the front end portion.

The negative electrode terminal 15 is coupled to the inner uncoated region 122b of the front end portion by welding, and includes an additional outer coated region 124a at an opposite side of the inner uncoated region 122b of the front end portion.

The coated region 11a of the positive electrode 11 includes double-sided coated regions 113a and 114a corresponding to the additional outer coated region 124a.

The additional outer coated region 124a faces the inner coated region 113a of the double-sided coated regions 113a and 114a of the positive electrode 11, thereby increasing the capacity of the rechargeable battery.

The additional outer coated region 124a is formed to have the same thickness as the thickness t3 of the outer coated region 122a that is formed at the outer side of the negative electrode 12.

Accordingly, when the same area is compared, the additional outer coated region 124a of the negative electrode 12 and the inner coated region 113a of the positive electrode 11 may have the same capacity as the outer coated region 122a of the negative electrode 12 and the inner coated region 111a of the positive electrode 11.

In other words, in the negative electrode 12, the additional inner coated region 123a is formed at the opposite side of the outer uncoated region 121b in the terminal end portion of the electrode assembly 110, while the additional outer coated region 124a is formed at the opposite side of the inner uncoated region 122b of the front end portion in the front end portion of the electrode assembly 110.

Thus, the additional inner coated region 123a of the negative electrode 12 and the additional outer coated region 124a further face the coated region 11a of the positive electrode 11, thereby increasing capacity of the rechargeable battery and improving stability thereof.

The uncoated region 11b of the positive electrode 11 further includes the double-sided uncoated regions 113b and 114b corresponding to the outer uncoated region 123b of the negative electrode 12 in the front end portion of the electrode assembly 110.

The double-sided uncoated regions 113b and 114b can minimize capacity degradation of the rechargeable battery since they are minimally formed due to the double-sided coated regions 113a and 114a.

In the exemplary embodiment of the present invention, a pouch type of rechargeable battery is illustrated, but it may also be applicable to cylindrical and prismatic rechargeable batteries.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| Description of Symbols | |
|---|---|
| 11: first electrode (positive electrode) | 11a, 12a: coated region |
| 11b, 12b: uncoated region | 12: second electrode (negative electrode) |
| 13: separator | 14: first electrode terminal (positive electrode terminal) |
| 15: second electrode terminal (negative electrode terminal) | |
| 16, 17: insulating member | |
| 110: electrode assembly | 111a, 121a: inner coated region |
| 111b: inner uncoated region | 112a, 122a: outer coated region |
| 112b, 121b: outer uncoated region | |
| 113a, 114a: double-sided (inner and outer side) coated region | |
| 113b, 114b: double-sided uncoated region | 120: case (pouch) |
| 121: polymer sheet | 122: nylon sheet |
| 122b: inner uncoated region of front end portion | |
| 123a: additional inner coated region | |
| 123b: outer uncoated region of front end portion | 123: metal sheet |

| Description of Symbols | |
| --- | --- |
| 124a: additional outer coated region | 201: first exterior member |
| 202: second exterior member | L1, L2, L3: first, second, third length |
| t1, t2, t3: thickness | W: width of electrode assembly |

What is claimed is:

1. A rechargeable battery comprising:
a wound electrode assembly comprising a separator between a first electrode and a second electrode, wherein the first and second electrodes each include uncoated regions and coated regions;
a case accommodating the wound electrode assembly; and
a first electrode terminal and a second electrode terminal respectively coupled to the first and second electrodes and extending from the case, wherein the uncoated regions of the first electrode includes an inner uncoated region and an outer uncoated region of a terminal end portion located at an outermost side of the wound electrode assembly, wherein the second electrode includes an outer uncoated region of a terminal end portion facing the inner uncoated region of the first electrode, wherein the second electrode includes an inner coated region at an opposite side of the outer uncoated region of the second electrode and the inner coated region of the second electrode overlaps the outer uncoated region of the second electrode,
wherein the inner coated region of the second electrode overlaps the coated region of the first electrode, and
wherein the terminal end portion of the second electrode comprises a terminal edge of the second electrode and portions of a first side of the second electrode and a second side of the second electrode that extend from the terminal edge such that the outer uncoated region of the terminal end portion extends along the entire terminal edge from the first side of the second electrode to the second side of the second electrode.

2. The rechargeable battery of claim 1, wherein, in the terminal end portion of the first electrode, the inner uncoated region of the first electrode has a first length L1 corresponding to a width W of the wound electrode assembly, and the outer uncoated region of the first electrode has a second length L2 corresponding to one winding range of the outermost side of the wound electrode assembly.

3. The rechargeable battery of claim 1, wherein the outer uncoated region of the second electrode has a third length L3 that is at least about two-thirds of a width W of the wound electrode assembly.

4. The rechargeable battery of claim 3, wherein the inner coated region of the second electrode is formed at an opposite side of the outer uncoated region of the second electrode to have about the same length as the third length.

5. The rechargeable battery of claim 3, wherein the inner coated region of the second electrode includes one portion that has a thickness which is greater than a thickness of the inner coated region of the second electrode that is at an inner side of the second electrode.

6. The rechargeable battery of claim 1, wherein the first electrode further includes double-sided uncoated regions of a front end portion that is located at about a center of the wound electrode assembly, wherein the second electrode includes inner and outer uncoated regions of the front end portion located at the center of the wound electrode assembly, wherein the second electrode terminal is coupled to the inner uncoated region of the front end portion, and wherein an additional outer coated region is provided at an opposite side of the inner uncoated region of the front end portion.

7. The rechargeable battery of claim 6, wherein the additional outer coated region has the same thickness as a thickness of the outer coated region of the second electrode.

8. The rechargeable battery of claim 6, wherein the second electrode includes an additional inner coated region located at an opposite side of the outer uncoated region of the second electrode in the terminal end portion of the second electrode of the wound electrode assembly, and an additional outer coated region located at an opposite side of the inner uncoated region of the front end portion of the wound electrode assembly.

9. The rechargeable battery of claim 8, wherein the uncoated region of the first electrode further includes double-sided uncoated regions corresponding to the outer uncoated region of the second electrode in the front end portion of the wound electrode assembly, and wherein the coated region of the first electrode includes double-sided coated regions corresponding to the additional outer coated region.

* * * * *